April 29, 1958     F. E. GILMORE     2,832,578
VAPOR-LIQUID CONTACTING APPARATUS
Filed Dec. 21, 1953
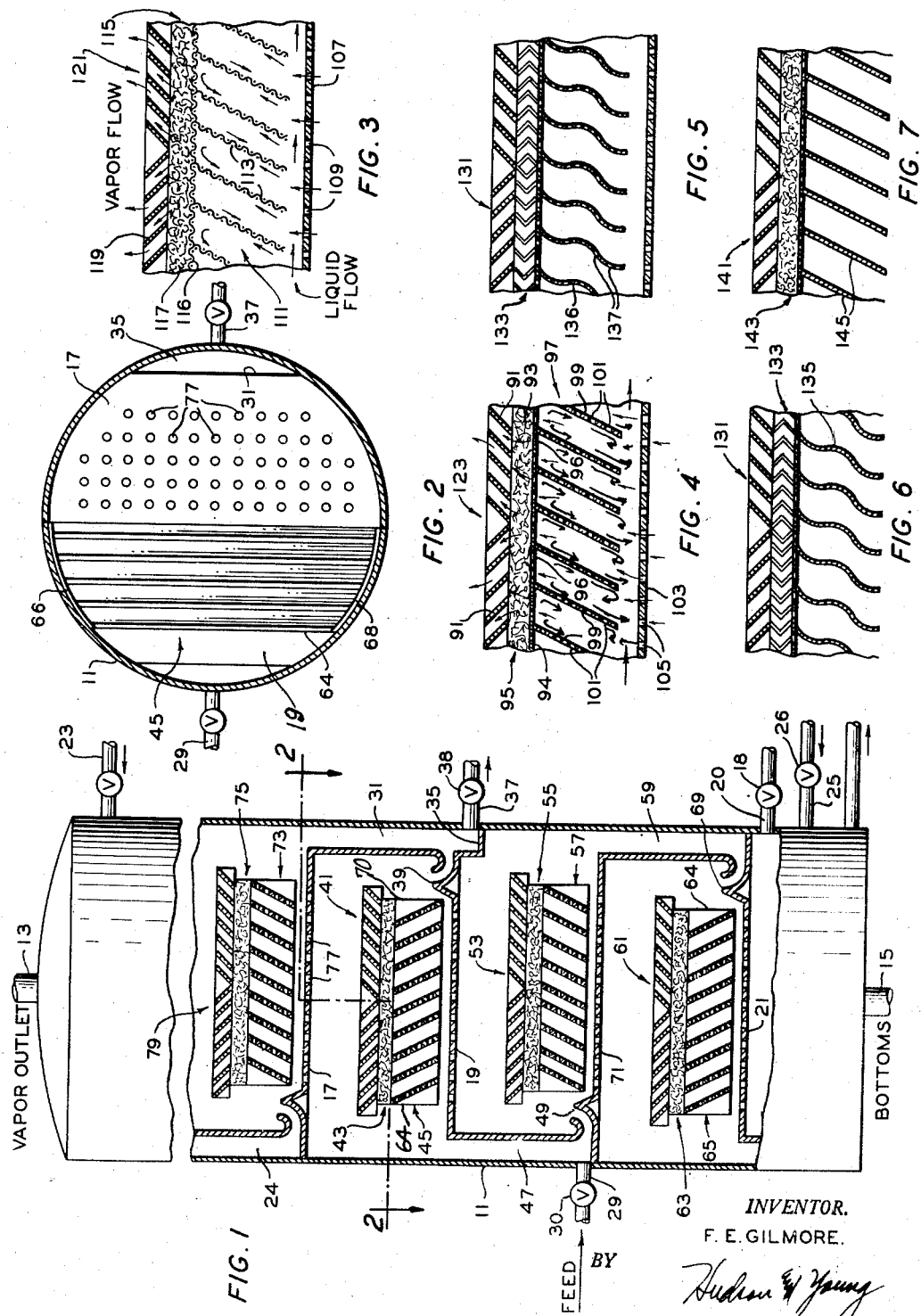
INVENTOR.
F. E. GILMORE.
BY
ATTORNEYS United States Patent Office 2,832,578
Patented Apr. 29, 1958

2,832,578

VAPOR-LIQUID CONTACTING APPARATUS

Forrest E. Gilmore, Bartlesville, Okla., assignor to Phillips Petroleum Company, a corporation of Delaware Application December 21, 1953, Serial No. 399,481

7 Claims. (Cl. 261—114)

This invention relates to vapor-liquid contacting apparatus. In one aspect it relates to vapor-liquid contacting apparatus for use in such contacting equipment as fractionators, absorbers, strippers and such chemical treaters as dehydrators, amine treaters and the like.

The contacting apparatus of my invention is applicable for use in substantially any application wherein the liquid load to be treated is small and especially wherein the liquid load is smaller than that ordinarily employed when using conventional bubble cap tray contacting equipment.

An object of my invention is to provide efficient vapor-liquid contacting apparatus for use in fractionators, absorbers, strippers and in any operation wherein vapor-liquid contacting is employed.

Another object of my invention is to provide a relatively inexpensive type of vapor-liquid contacting equipment.

Still another object of my invention is to provide an efficient vapor-liquid contacting apparatus which is relatively simple to manufacture.

Still another object of my invention is to provide a vapor-liquid contacting apparatus suitable for use outside the range of liquid loading ordinarily employed for conventional bubble cap tray contacting equipment.

Still other objects and advantages of my invention will be realized upon reading the following specification and drawing, which respectively describes and illustrates my invention.

In the drawing, Figure 1 is an elevational view partly in section of a tower employing the vapor-liquid contacting apparatus of my invention.

Figure 2 is a cross-sectional view taken on the line 2—2 of Figure 1.

Figure 3 is a cross-sectional view of another embodiment of my vapor-liquid contacting apparatus.

Figure 4 is a cross-sectional view of still another embodiment of contacting apparatus of my invention.

Figure 5 is a cross-sectional view of still another embodiment of vapor-liquid contacting apparatus.

Figure 6 is a cross-sectional view of yet another embodiment of vapor-liquid contacting apparatus.

Figure 7 is a cross-sectional view of another embodiment of vapor-liquid contacting apparatus.

Referring now to Figure 1, vessel 11 represents a more or less conventional vertically disposed column in which fractional distillation, stripping, absorbing or like operations are carried out. Such a vessel is ordinarily provided with bubble cap tray packing apparatus or other type of packing. Such a vessel is equipped with an overhead vapor outlet line 13 and a bottom product withdrawal line 15. In case the apparatus is used for fractional distillation a side product withdrawal line 37 is provided, a reflux line 23 and a feed line 29 are shown. However, when this tower is used for stripping absorbed gases from a liquid, line 23 is used as the feed line. A valve 38 in the side line 37 is closed and a valve 30 in the feed line 29 is also closed. Obviously, in case of a distillation operation a valve 26 in a reboiler heating medium inlet line 25 is open and in case the column is used for stripping operations reboiling heat may also be needed. If the column is used for gaseous absorption operations a lean absorption medium is introduced through line 23, the gas to be treated is introduced through a line 20 with of course a valve 18 being opened. In this latter case, valve 30 in line 29 is closed and rich absorption medium is removed through line 15 while the treated gas is removed through the outlet line 13. In any of these operations a liquid medium flows, in general, downward in the column while a vapor flows, in general, upward through the column, contacting being achieved at many levels in the column.

In distillation operations, for example, reflux is added through line 23 and flows, in general, downward through the column. Thus reflux will flow downward through a downspout arrangement 24 to the upper surface of a perforate tray 17. Liquid will flow from the left hand side of tray 17 toward the right hand side and thence downward through a downcomer 31 to a next lower tray. On passing across tray 17 vapor from below this tray passes upward through perforations 77 and will mix with liquid flowing across the tray and the mixture of vapor and liquid is jetted upward between baffles in a baffle assembly 73. Vapor on reaching the top of the baffles passes through a mist extractor 75 and thence to a gas diffuser for distributing the upflowing gas equally across the cross-section of the vessel. It is intended that the depth of liquid on the tray or perforate plate 17 be sufficiently deep as to submerge the lower end of the perforate baffle assembly 73 so that when vapors jet upward through the perforations 77 liquid will be positively entrained therein and carried upward only in the baffle assembly. For this reason mist extractor 75 covers only the top of a baffle assembly 73 and need not extend entirely or even substantially entirely across the vessel 11. When the extractor is made of glass fiber as hereinafter set forth, it offers substantially no resistance to fluid flow.

On reference to Figure 4, one can see more clearly the operation of the contacting baffles being used. Vapor from below a perforate tray 103 jets upward through perforations 105 and entrains liquid and carries the liquid upward between baffles 99 of the assembly 97. Baffles 99 are arranged to slope in the direction of flow of liquid across the tray so that the tendency is for liquid flowing below the contactor assembly to rise upward between the baffles 99. It is intended that the vapor flowing through the openings 105 be at a sufficient velocity to entrain liquid and carry it upward and for the liquid to impinge against the surfaces of the baffles 99. After the liquid contacts the surface the liquid runs downward and in a general upstream direction with respect to the flow of liquid between the baffle assembly and the perforate tray. A portion of this upward flowing vapor, and liquid pass through openings 101 in baffle 99 to contact liquid flowing downward on the surfaces of these baffles. Liquid flowing down from the baffle surfaces is then again entrained by vapor jetting through openings 105 and in this manner there is a considerable recycling of the liquid while being contacted with the vapors. Vapor from the upper portion of the spaces between the baffles 99 with suspended mist passes through perforations 96 in plate 94 into a mist extractor 95. This mist extractor retains the fine mist particles and thus separates the liquid from the gas. The gas passes on upward from the mist extractor and through a gas diffuser 123 for directing the flow of gases across substantially the entire cross-section of the contacting tower. Liquid which is entrained and held by the mist extractor flows downward therefrom through the perforations 96 in plate 94 and flows downward on the surfaces of the contacting baffles 99 for recycling with the upflowing vapors as just described.

In Figure 1, I have shown several vapor-liquid contacting tray assemblies which are provided with perforate trays 77, 19, 71 and 21. Just above each of these trays is disposed baffle contactor assemblies 73, 45, 57 and 65, respectively. Above each of these contactor baffle assemblies is disposed a mist extractor 75, 43, 55, and 63 respectively, while above these elements are disposed gas diffusers 79, 41, 53 and 61 respectively. Each of the contactor-mist extractor-diffuser assemblies is similar in its operation to that just described relative to the embodiment of apparatus of Figure 4.

In the vessel 11 each of the downcomers is provided with a vapor trap such as trap 39 in conjunction with downcomer 31 and trap 69 in conjunction with downcomer 59. These vapors traps, of course, are intended to operate in such a manner that liquid flows from the tray above down the downcomer and through the trap onto the perforate plate and vapor cannot flow in the reverse direction.

When the vessel 11 is used as a fractionator and it is desired to take off a side stream through the side draw pipe 37 the side draw pipe is attached to vessel 11 so that liquid can be withdrawn from a well or sump 35 and liquid which is withdrawn from this point will have the composition of the contacted liquid passing from the tray 17 to tray 19. A trap 49 in conjunction with downcomer 47 is provided on the opposite side of the column for passage of liquid from tray 19 to tray 71.

Figure 2 is a cross-sectional view taken on the line 2—2 of Figure 1. The right hand portion of Figure 2 is intended to illustrate the appearance of the top surface of a plate 17 containing perforations while the left hand portion illustrates the appearance of the upper portion of the baffle contactor assembly 45. The portion of Figure 2 to the left to the plate 19 is the downcomer 47 through which liquid from the top of tray 19 passes to the next lower tray. On the right hand side of Figure 2 is shown the side product withdrawal line 37 and the well or sump 35 into which the side product enters prior to its removal through line 37. Elements 66 and 68 are curved plates and are intended to be plates fitting the inner wall of the vessel 11 and to which the baffles are attached. Element 64 is a plate forming one of the enclosing walls of the baffle assembly 45. Thus this baffle assembly is enclosed on its sides by plate 64, the circular plate 68, plate 70 and circular plate 66.

In Figure 3 of the drawing is another embodiment of contacting apparatus of my invention in which a contacting baffle assembly 111 is made of screens or woven wire of relatively small mesh openings. While it is intended that the openings be relatively small the wire of which the screen is woven is heavy wire to impart strength to the baffles. Immediately above the baffle assembly 111 is disposed a mist extractor 115 which may be similar to that described in relation to Figures 1 and 4. Above the mist extractor is a gas diffuser 121 which also may be similar to the diffusers of Figures 1 and 4. The diffuser 121 is provided with baffles 119 for directing the flow of gas.

The packing material 117 in the mist extractor 115 and in extractors 75, 43, 55 and 63 of Figure 1 and in extractor 95 of Figure 4 can be any material which is suitable for the purpose at hand. I find that such material as glass fiber, metal turnings, metal wool such as steel turnings, or wool, turnings of iron, monel, copper and brass are satisfactory. Aluminum turnings may also be used in case materials being treated are free from alkali. When glass fiber material is used, I find that by compressing a three-inch thickness of glass fiber material to about half that thickness a very efficient mist extractor is produced. The mist extractor packing material 117 of Figure 3 is illustrated as being contained between screen 116 and the diffuser 121 for support. However, in place of screen 116, a perforate plate such as perforate plate 94 of Figure 4 can be used. In case such a perforate plate is used, it is preferable that the ratio of perforations be relatively large so as not to restrict the flow of gas unduly.

In the operation of the embodiment illustrated in Figure 3 gases rise upward through perforations 109 in plate 107 and entrain liquid flowing from left to right across the tray and carry the liquid upward within a screen member 111. The screens 113 of course have a relatively large ratio of openings and since these screens are woven of relatively heavy gage wire the metal surfaces are relatively large and allow liquid to flow down the screen and to tend to restrict liquid flowing from left to right across the tray at the same time vapor is jetting through openings 109. In this manner the same general recycling and re-contacting of liquid with vapor is achieved as that explained relative to the perforate plates of Figure 4.

In Figure 5 is illustrated still another embodiment of my invention in which corrugated plates 136 having perforations 137 are used as contacting baffles while in the embodiment of Figure 6 corrugated nonperforate plates 135 are provided. The perforations 137 of plates 136 are intended to operate in a manner similar to perforations 101 of Figure 4 and of the openings in the screens 113 of Figure 3. These perforations and openings are intended to provide additional surface to the contacting baffles and to permit as much vapor as possible to pass through them for additional contacting. Some vapor obviously passes through these openings but the major part, by far, passes upward between the baffles and through the mist extractor and diffuser and on to the next stage of contacting.

In Figure 7 is illustrated still another embodiment of my contacting apparatus in which the contacting baffles 145 are nonperforate or are merely slats arranged parallel and sloping in the direction indicated. Immediately above these nonperforate slats 145 is disposed a mist extractor 143 and a diffuser 141 similar to those described above. In Figure 5 is illustrated a different type of mist extractor 133. This type of mist extractor is a conventional type and finds many applications. A diffuser 131 is placed above this mist extractor.

In some applications the contact baffles are wooden slats and in other applications they are metal slats with or without perforations as desired. The slats can also be corrugated with the corrugation ordinarily running horizontally. As mentioned relative to Figures 5 and 6 the corrugated salts or plates can either be perforated (Figure 5) or not perforated (Figure 6) as desired.

The vapor-liquid contacting assemblies of my invention are intended to be such that a large percentage of the liquid passing across a perforate tray is thrown upward by vapor jetting through the tray perforations against the inclined baffles and some of the liquid is carried by the vapor as mist making necessary the use of the mist extractors. A considerable proportion, for example as great a proportion as 10 percent to 75 percent of the liquid jetted runs down the baffles on the upstream side of the jet in regard to direction of liquid flow on the tray to its bottom edge thereby giving a large recycle of liquid. When using perforated baffles or screens some of the vapor will pass through the perforations but since its inertia is low it tends to disperse and to follow the path of least resistance and it flows between the inclined baffles while the liquid will be jetted against the inclined baffles and flows downward on them to the tray. It is noted that my mist extractor does not cover all the cross-section of the tower but covers only that portion where the gas velocity is high enough to entrain liquid. The gas diffuser might remove some entrainment but is intended to diffuse the vapors so their velocity at any point will be low enough that any liquid remaining therein will drop out. The diffuser is made of inclined baffles as shown.

The vapor-liquid contacting tray assemblies of my invention have particular utility in vapor-liquid contacting operations where liquid loads are so low that the usual types of liquid-vapor contacting apparatus are not suitable. My contacting apparatus is especially suitable for use in fractionation of air at low temperatures for the production of oxygen and nitrogen as separate products. My contacting equipment can also be used in absorption operations, for example, where one gas is to be selectively absorbed from another by a liquid absorbent. For example, one hydrocarbon gas can be selectively absorbed from another by a liquid absorption medium. My contacting apparatus is used in dehydrating operations, wherein a liquid dehydrating agent, such as glycol, is used to absorb moisture from gas. The apparatus is also used in treating operations such as amine treaters for removal of acidic from nonacidic gases.

Many other applications of my contacting apparatus will be realized by those skilled in the art.

I claim:

1. In a column for contacting a liquid with a vapor, a vapor-liquid contacting tray assembly comprising, in combination, a first tray, a portion of said first tray being perforated, the perforations having their axes vertically disposed so that vapors passing therethrough do so in a substantially vertical direction, a vapor-liquid contacting baffle assembly comprising a plurality of mutually parallel baffles disposed at a spaced distance above the perforated portion of said first tray, the transverse axes of said baffles being disposed generally upright, first means for introducing liquid from a tray immediately above said first tray to one side of said first tray, a vapor seal integral with said first tray, said vapor seal being disposed intermediate said vapor-liquid baffle assembly and the lower portion of said first means and extending upward from said first tray to a level above the bottom edge of said first means, second means for passing liquid from the other side of said first tray to a next lower tray, the lower edges of said baffles being disposed in close proximity to said first tray whereby in normal operation vapor passing upward through said perforations entrains liquid flowing from said seal toward the other side of said first tray and said vapor and entrained liquid impinge against said baffles thereby entraining mist in this latter vapor, a mist extractor for extracting entrained mist, said extractor being disposed above and in contact with said vapor-liquid contacting baffle assembly, and a vapor diffuser for spreading vapors flowing from said mist extractor, said vapor diffuser being disposed above and in contact with said mist extractor.

2. In a column for contacting a liquid with a vapor, a vapor-liquid contacting tray assembly comprising, in combination, a first tray, a portion of said first tray being perforated, the perforations having their axes vertically disposed so that vapors passing therethrough do so in a substantially vertical direction, a vapor-liquid contacting baffle assembly comprising a plurality of mutually parallel plane and perforate baffles disposed at a spaced distance above the perforated portion of said first tray, the transverse axes of said baffles being disposed generally upright, first means for introducing liquid from a tray immediately above said first tray to one side of said first tray, a vapor seal integral with said first tray, said vapor seal being disposed intermediate said vapor-liquid baffle assembly and the lower portion of said first means and extending upward from said first tray to a level above the bottom edge of said first means, second means for passing liquid from the other side of said first tray to a next lower tray, the lower edges of said baffles being disposed in close proximity to said first tray whereby in normal operation vapor passing upward through said perforations entrains liquid flowing from said seal toward the other side of said first tray and said vapor and entrained liquid impinge against said baffles thereby entraining mist in this latter vapor, a glass fiber mist extractor for extracting entrained mist, said extractor being disposed above and in contact with said vapor-liquid contacting baffle assembly, and a vapor diffuser for spreading vapors flowing from said mist extractor, said vapor diffuser being disposed above and in contact with said mist extractor.

3. In a column for contacting a liquid with a vapor, a vapor-liquid contacting tray assembly comprising, in combination, a first tray, a portion of said first tray being perforated, the perforations having their axes vertically disposed so that vapors passing therethrough do so in a substantially vertical direction, a vapor-liquid contacting baffle assembly comprising a plurality of mutually parallel baffles disposed at a spaced distance above the perforated portion of said first tray, the transverse axes of said baffles being disposed generally upright, first means for introducing liquid from a tray immediately above said first tray to one side of said first tray, a vapor seal integral with said first tray, said vapor seal being disposed intermediate said vapor-liquid baffle assembly and the lower portion of said first means and extending upward from said first tray to a level above the bottom edge of said first means, second means for passing liquid from the other side of said first tray to a next lower tray, the top edge of each baffle being farther than its bottom edge from said first means, the lower edges of said baffles being disposed in close proximity to said first tray whereby in normal operation vapor passing upward through said perforations entrains liquid flowing from said seal toward the other side of said first tray and said vapor and entrained liquid impinge against said baffles thereby entraining mist in this latter vapor, a mist extractor for extracting entrained mist, said extractor being disposed above and in contact with said vapor-liquid contacting baffle assembly, a vapor diffuser for spreading vapors flowing from said mist extractor, said vapor diffuser being disposed above and in contact with said mist extractor, said vapor diffuser comprising a plurality of elongated spaced diffuser baffles, the longitudinal axes of which are mutually parallel, the transverse axes of the diffuser baffles disposed above half the area of the mist extractor sloping upward and away from the axis of said column, and the transverse axes of the diffuser baffles disposed above the other half of the area of the mist extractor sloping upward and away from the axis of said column in the opposite direction from the slope of the first mentioned sloping diffuser baffles in such a manner as to spread vapors flowing upward through the mist extractor.

4. The vapor-liquid contacting tray assembly of claim 3 wherein said mutually parallel baffles are plane and nonperforate.

5. The vapor-liquid contacting tray assembly of claim 3 wherein said mutually parallel baffles are screen.

6. The vapor-liquid contacting tray assembly of claim 3 wherein said mutually parallel baffles are corrugated.

7. In a column for contacting a liquid with a vapor, a vapor-liquid contacting tray assembly comprising, in combination, a first tray, a portion of said first tray being perforated, the perforations having their axes vertically disposed so that vapors passing therethrough do so in a substantially vertical direction, a vapor-liquid contacting baffle assembly comprising a plurality of mutually parallel plane and perforate baffles disposed at a spaced distance above the perforated portion of said first tray, the transverse axes of said baffles being disposed generally upright, first means for introducing liquid from a tray immediately above said first tray to one side of said first tray, a vapor seal integral with said first tray, said vapor seal being disposed intermediate said vapor-liquid baffle assembly and the lower portion of said first means and extending upward from said first tray to a level above the bottom edge of said first means, second means for passing liquid from the other side of said first tray to a next lower tray, the top edge of each baffle being farther than its bottom edge from said first means, the lower edges of said baffles being disposed in close proximity to said first tray whereby in normal operation vapor passing upward through said perforations entrains liquid flowing from said seal toward the other side of said first tray and said vapor and entrained liquid impinge against said baffles thereby entraining mist in this latter vapor, a glass fiber mist extractor for extracting entrained mist, said extractor being disposed above and in contact with said vapor-liquid contacting baffle assembly, and a vapor diffuser for spreading vapors flowing from said mist extractor, said vapor diffuser being disposed above and in contact with said mist extractor.

References Cited in the file of this patent

UNITED STATES PATENTS

| | | |
|---|---|---|
| 1,655,998 | Gilmore | Jan. 10, 1928 |
| 1,744,261 | Cooke | Jan. 21, 1930 |
| 1,748,411 | Cooke | Feb. 25, 1930 |
| 1,748,595 | Chillas et al. | Feb. 25, 1930 |
| 2,022,740 | Rowell | Dec. 3, 1935 |
| 2,645,467 | Rupp | July 14, 1953 |
| 2,681,219 | Thrift et al. | June 15, 1954 |
| 2,737,377 | Huggins et al. | Mar. 6, 1956 |
| 2,757,915 | Huggins | Aug. 7, 1956 |

FOREIGN PATENTS

| | | |
|---|---|---|
| 1,048,712 | France | Aug. 5, 1953 |